UNITED STATES PATENT OFFICE.

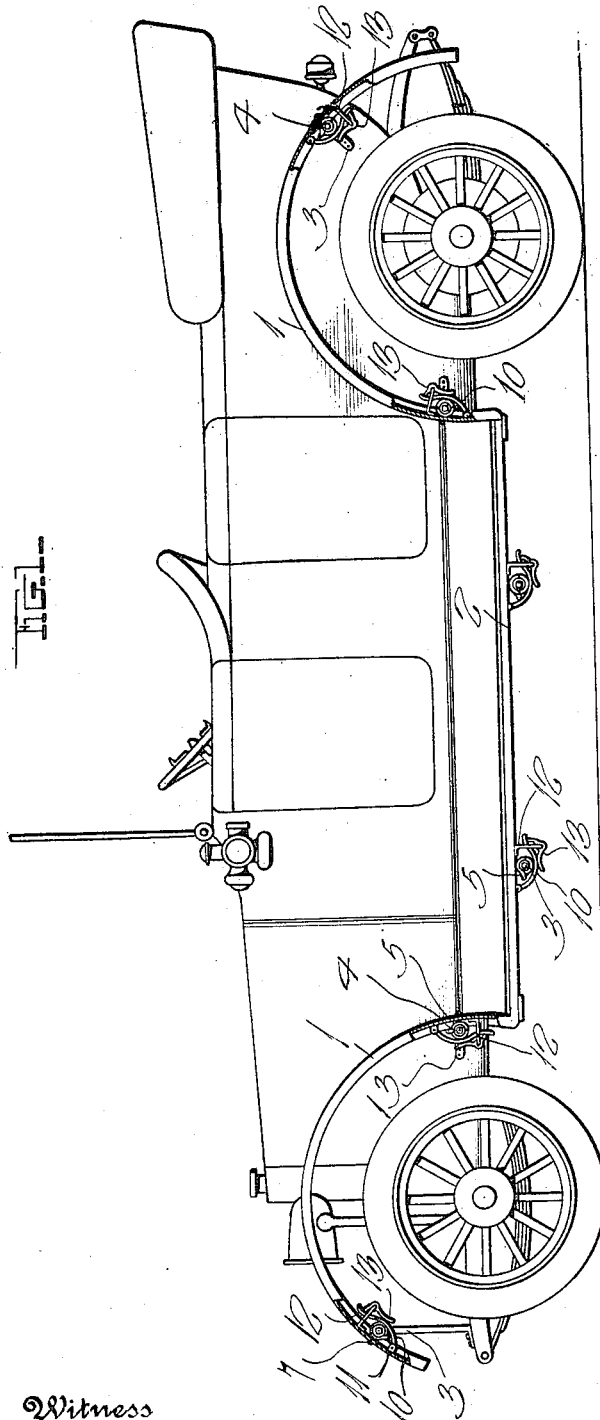

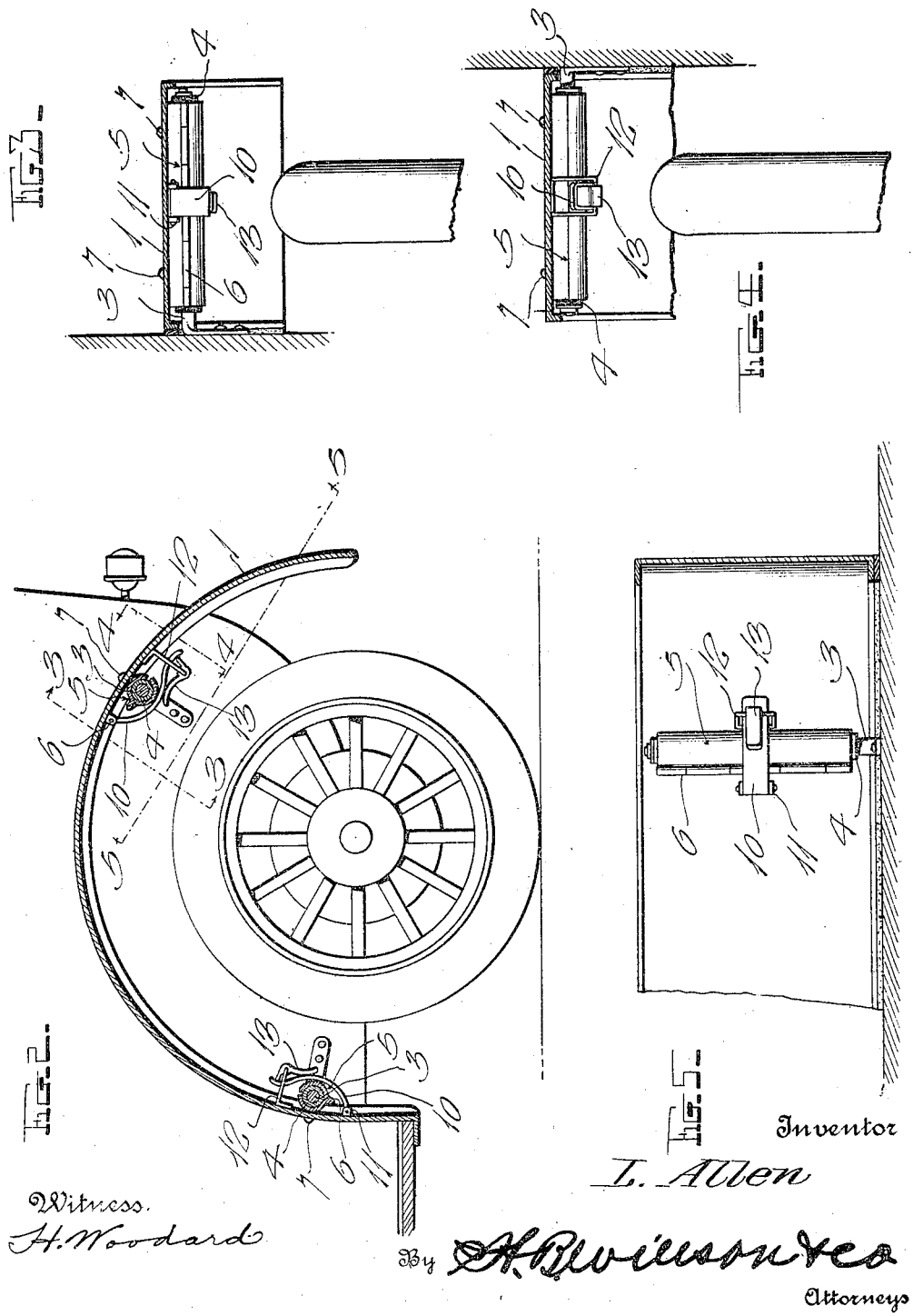

LAFAYETTE ALLEN, OF RUTLAND, VERMONT.

AUTOMOBILE RUNNING-BOARD AND FENDER.

1,289,594.

Specification of Letters Patent. Patented Dec. 31, 1918.

Application filed November 22, 1917. Serial No. 203,425.

*To all whom it may concern:*

Be it known that I, LAFAYETTE ALLEN, a citizen of the United States, residing at Rutland, in the county of Rutland and State of Vermont, have invent certain new and useful Improvements in Automobile Running-Boards and Fenders; and I do declare the following to be a full, clear, and exact description of the invention, such as will enable others skilled in the art to which it appertains to make and use the same.

My invention has for its object to provide comparatively simple and inexpensive, yet highly efficient means for detachably connecting the running boards and the fenders of automobiles to the machine, whereby these parts may be easily removed for cleaning or for making adjustments and repairs.

With the foregoing general object in view, the invention resides in the novel features of construction and unique combinations of parts to be hereinafter fully described and claimed, the descriptive matter being supplemented by the accompanying drawings which form a part of this specification and in which:—

Figure 1 is a side elevation of an automobile showing the fenders and running boards secured in place by the present invention.

Fig. 2 is a vertical section of one of the rear fenders and its attaching means;

Figs. 3 and 4 are vertical transverse sections on the planes of lines 3—3 and 4—4 respectively of Fig. 2;

Fig. 5 is substantially a horizontal section on the plane indicated by the line 5—5 of Fig. 2, showing more particularly a bottom plan view of the attaching means;

Fig. 6 is a detail vertical section showing one form of the invention in released position;

Fig. 7 is a similar view showing another form of the device in operative position; and Fig. 8 is a detail elevation with the fender in section, showing the manner in which the latter may be swung to one side without being totally removed.

In the drawings above briefly described, the numerals 1 designate the front and rear fenders of an automobile, whereas the running boards are designated at 2. It is my intention to secure all of these parts detachably to the machine, in order that they may be quickly and easily removed whenever it should be desirable for any reason. This result may be attained in a number of ways, but for illustrative purposes I have illustrated only two, one form of the invention being shown in Figs. 1 to 6 and 8, whereas the other type is illustrated in Fig. 7. In either case, arms 3 extend laterally from the machine beneath the fenders and running boards, and are provided with yielding sleeves 4 of rubber or the like which are firmly gripped in split tubes 5 carried by the removable parts and extending transversely throughout approximately the entire width thereof.

Each tube 5 is split longitudinally into two halves, said halves being hinged together as shown at 6, and any preferred means such as the rivets 7 are provided for securing one half of this sleeve to the fender or running board, while additional means are employed for securing the free half of the tube in closed position.

The means last referred to may consist of one or more clamping bolts 8 such as depicted in Fig. 7, said bolts passing through ears 9 on the two halves of the tube, or the construction featured in the other views may be employed. This construction includes a preferably curved arm 10 having one end pivoted at 11 to the fender or the running board adjacent one side of the tube, said arm being adapted to extend across the free half of this tube, when the latter is closed as shown in Figs. 2 and 5, the free end of said arm being then received in a loop 12 secured to the removable part adjacent the opposite side of the tube, said loop being preferably formed of resilient metal in order that it may swing outwardly to release the arm 10 when necessary. A suitably constructed clamping lever 13 is fulcrumed on each loop 12, it being the office of these levers to retain the arms 10 in operative position as will be clear from Fig. 2. Release of the levers 13, however, will permit the free halves of the tubes 5 to swing outwardly, so that any required fender or running board may be quickly and easily detached. Also, if desired, it is only necessary in some cases to detach one end of the fender and to swing such fender around the connection at its other end. (See Fig. 8.)

From the foregoing, taken in connection with the accompanying drawings, it will be obvious that although my invention is of extremely simple and inexpensive nature, it will be highly efficient for the purposes intended. Particular emphasis is laid upon the fact that the tubes 5 extend substantially throughout the width of the fenders and running board, said tubes thus serving to reinforce these parts as well as retaining them in place upon the arms 3. Another highly important feature, is the provision of the yielding sleeves 4, since these sleeves insure that an extremely tight connection may be had, thus preventing any possibility of excessive vibration or rattling as the machine is in operation.

Since probably the best results are obtained from the features above described, these features are preferably employed, but I wish it understood that within the scope of the invention as claimed, numerous minor changes may well be made.

I claim:—

1. In combination with a vehicle body and a laterally projecting member to be detachably secured thereto; a half tube secured to the lower side of said member and extending substantially across the entire width thereof to reinforce said member, a second half tube hinged at one edge to said secured half, an arm secured to the vehicle body and receivable between said halves, and means for holding said halves snugly against said arm.

2. In combination with a vehicle having a running board and wheel fenders at the ends thereof; half tubes secured to the lower sides of said running board and fenders and extending substantially throughout the entire width thereof to reinforce them, other half tubes hinged at one edge to said secured halves, a plurality of arms secured to the vehicle body and receivable between said halves of the tubes, and means for holding said halves snugly against said arms.

In testimony whereof I have hereunto set my hand in the presence of two subscribing witnesses.

LAFAYETTE ALLEN.

Witnesses:
CHARLES R. BURGESS,
CHAS. E. NOVAK.